United States Patent [19]
Yoon

[11] Patent Number: 5,729,392
[45] Date of Patent: Mar. 17, 1998

[54] COMPACT ZOOM LENS SYSTEM

[75] Inventor: Young-Kyu Yoon, Changwon-si, Rep. of Korea

[73] Assignee: Samsung Aerospace Industries, Ltd., Kyeongsangnam-do, Rep. of Korea

[21] Appl. No.: 763,896

[22] Filed: Dec. 11, 1996

[30]     Foreign Application Priority Data

Dec. 11, 1995 [KR] Rep. of Korea .................. 95-48399

[51] Int. Cl.$^6$ ............................................. G02B 15/14
[52] U.S. Cl. ............................................. 359/692
[58] Field of Search ............................. 359/691, 692

[56]         References Cited

U.S. PATENT DOCUMENTS

| | | | |
|---|---|---|---|
| 5,164,859 | 11/1992 | Ito ................................. | 359/692 |
| 5,229,887 | 7/1993 | Hayashi et al. .............. | 359/692 |
| 5,353,162 | 10/1994 | Ito et al. ...................... | 359/692 |
| 5,381,270 | 1/1995 | Cho ............................... | 359/692 |

FOREIGN PATENT DOCUMENTS

| | | |
|---|---|---|
| 4-93810 | 3/1992 | Japan . |
| 6-14678 | 1/1994 | Japan . |
| 6-34884 | 2/1994 | Japan . |

*Primary Examiner*—David C. Nelms
*Assistant Examiner*—Evelyn A. Lester
*Attorney, Agent, or Firm*—Finnegan, Henderson, Farabow, Garrett & Dunner, L.L.P.

[57]         ABSTRACT

A compact zoom lens system is disclosed which comprises a first lens group having an overall positive refractive power and a second lens group having an overall negative refractive power. The magnification of the compact zoom lens system can be varied by varying the distance between the first lens group and the second lens group in accordance with the following condition:

$$0.59 < f_I/f_w < 0.67$$

where $f_w$ represents the focal length of the entire lens system, and $f_I$ represents the focal length of the first lens group.

3 Claims, 11 Drawing Sheets

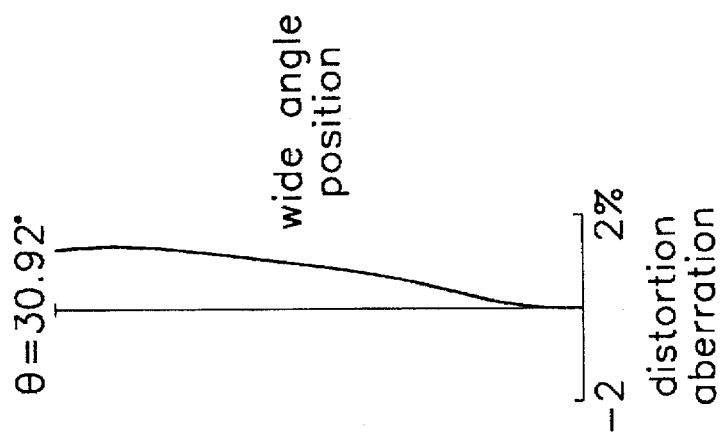
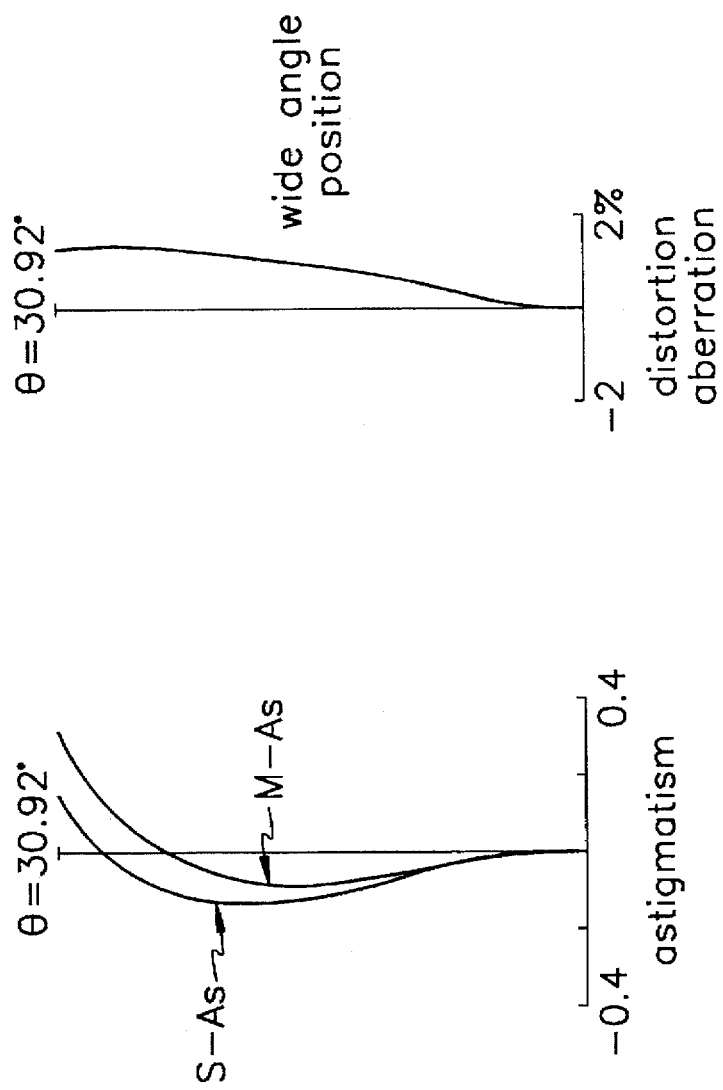
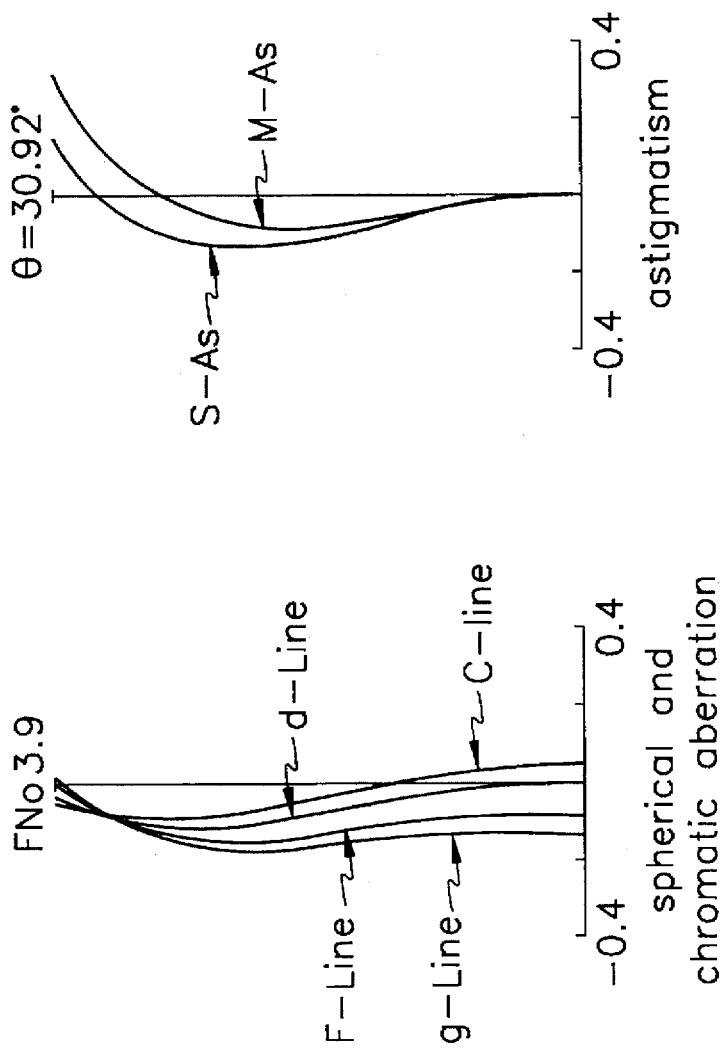

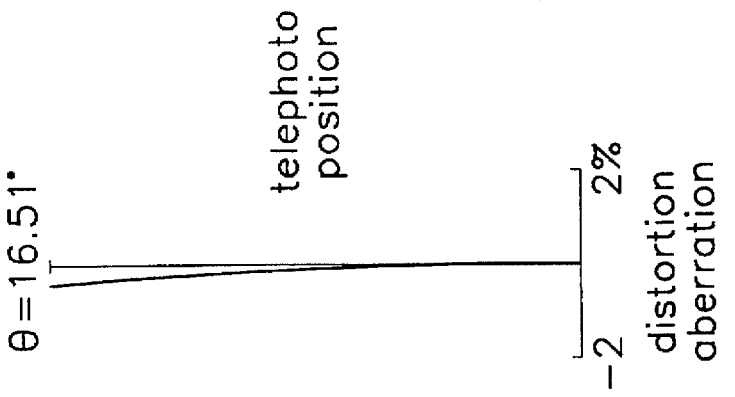
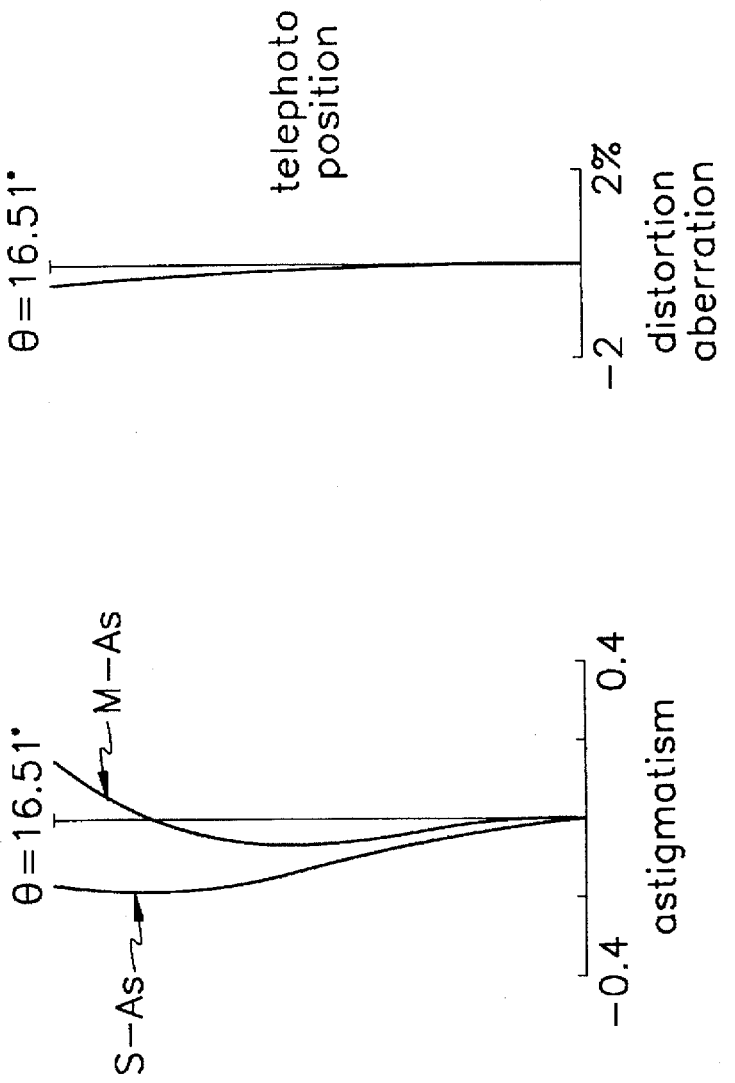
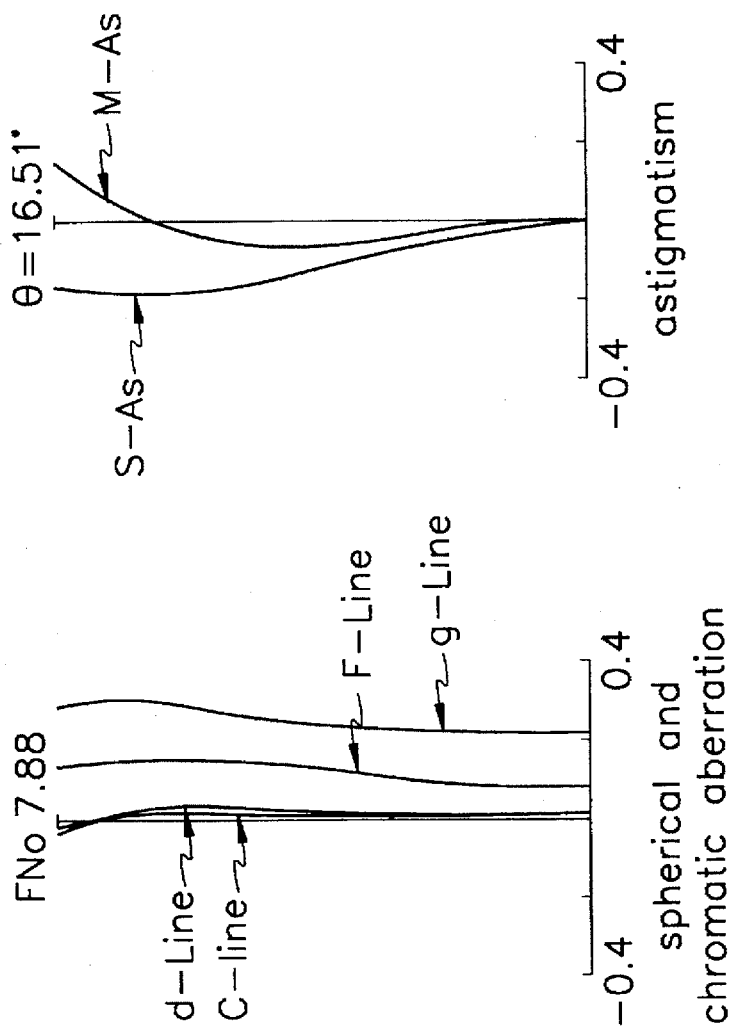

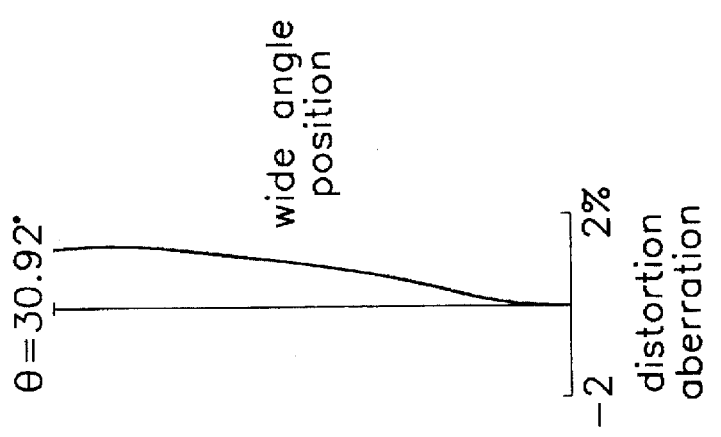
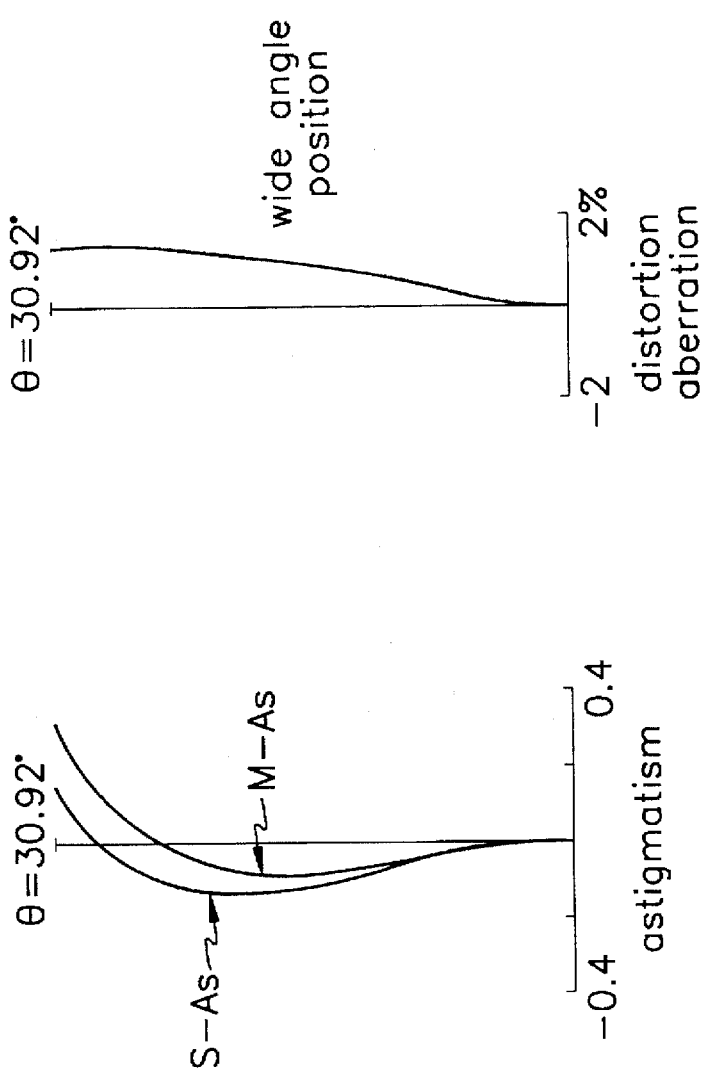
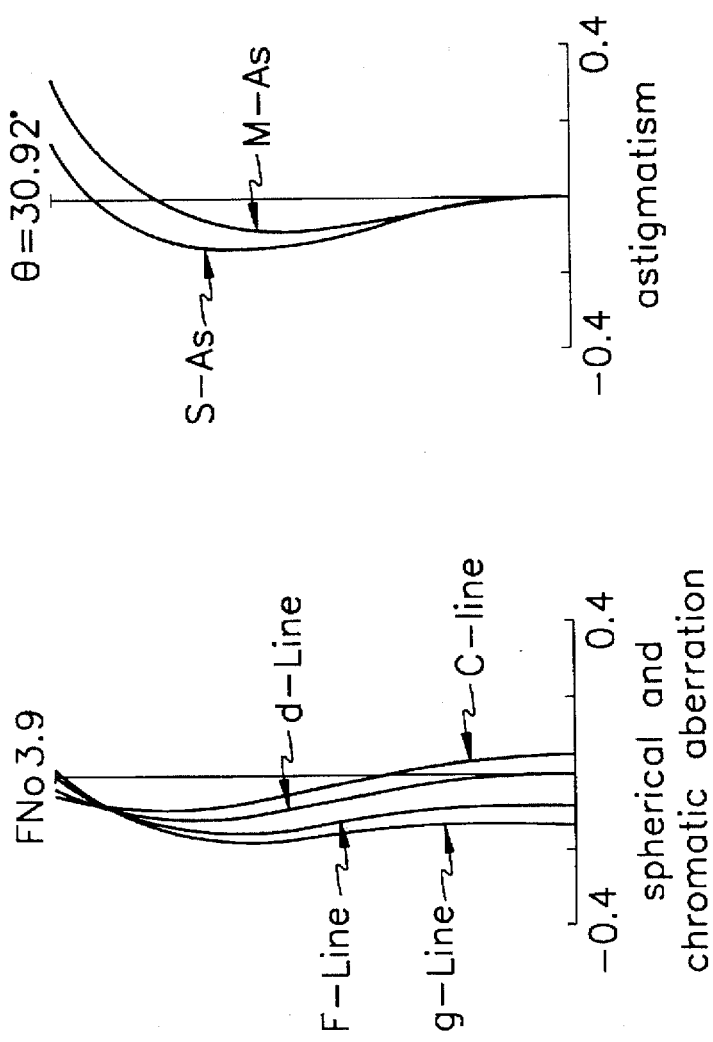

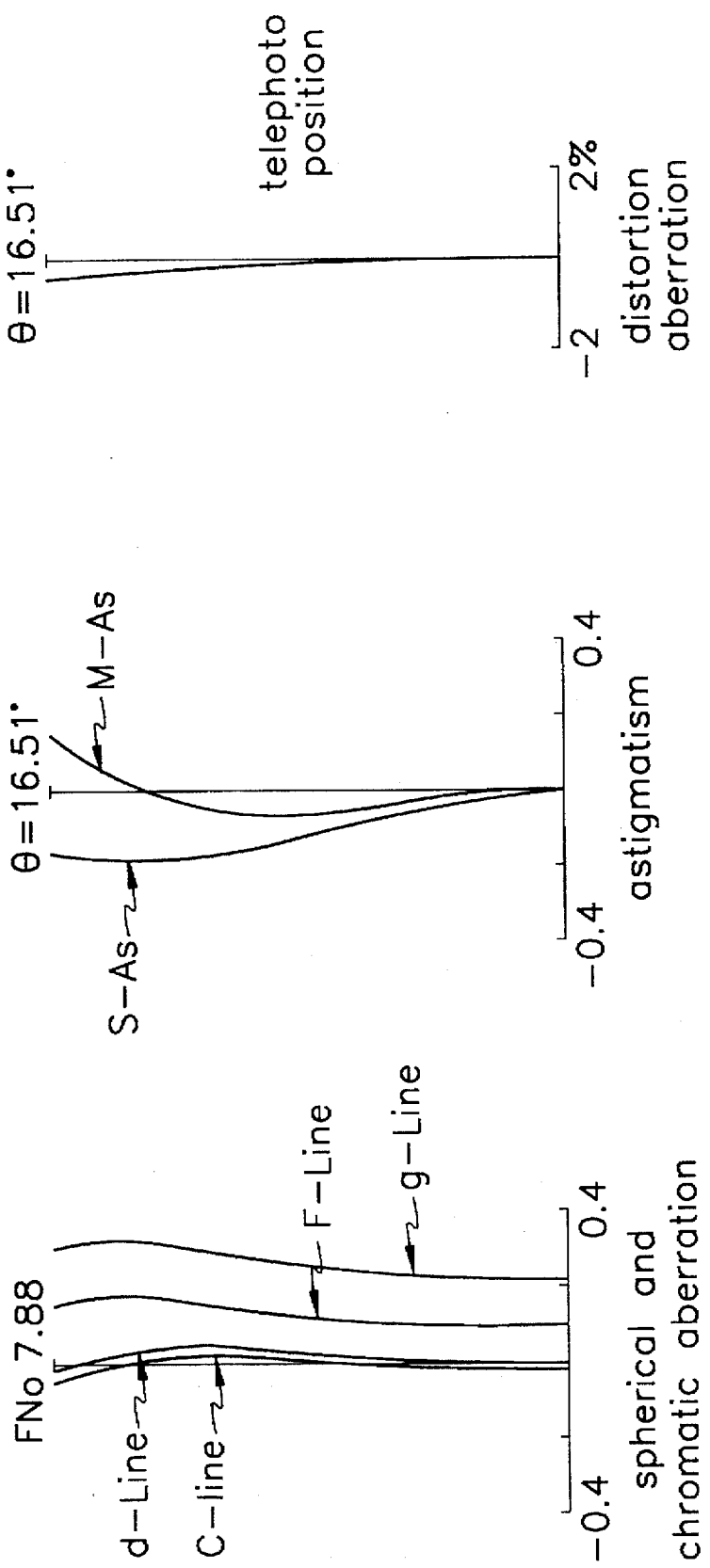

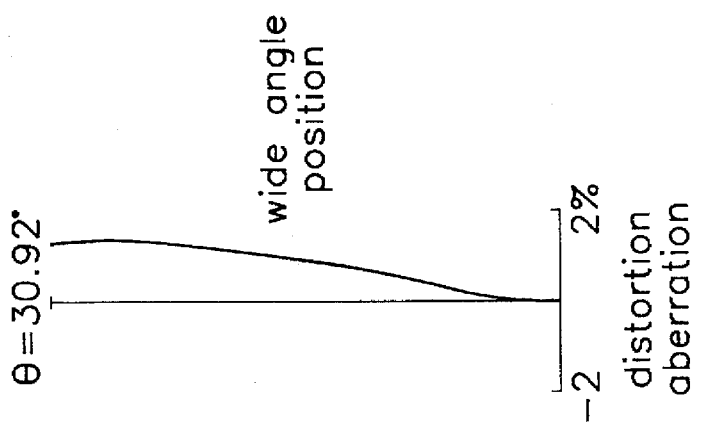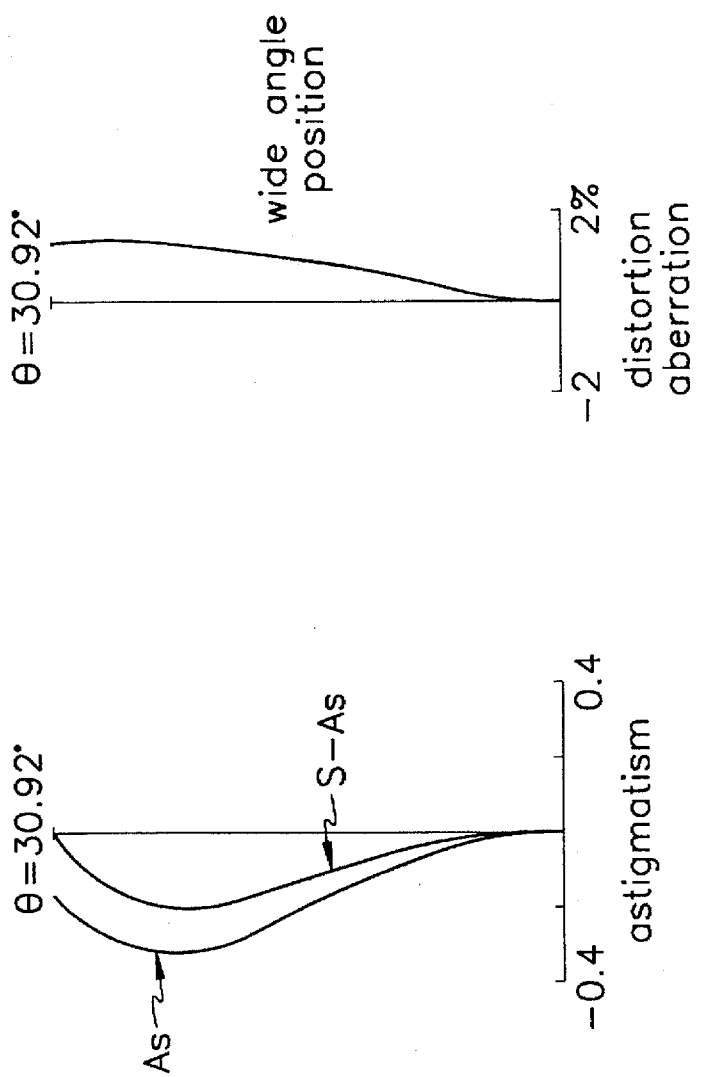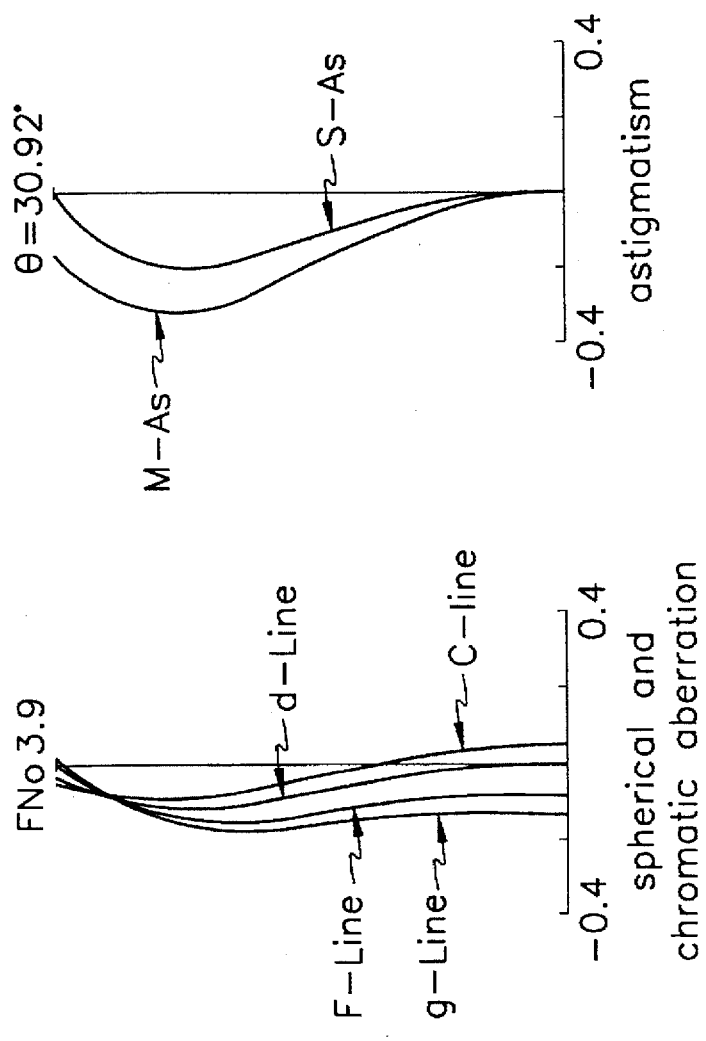

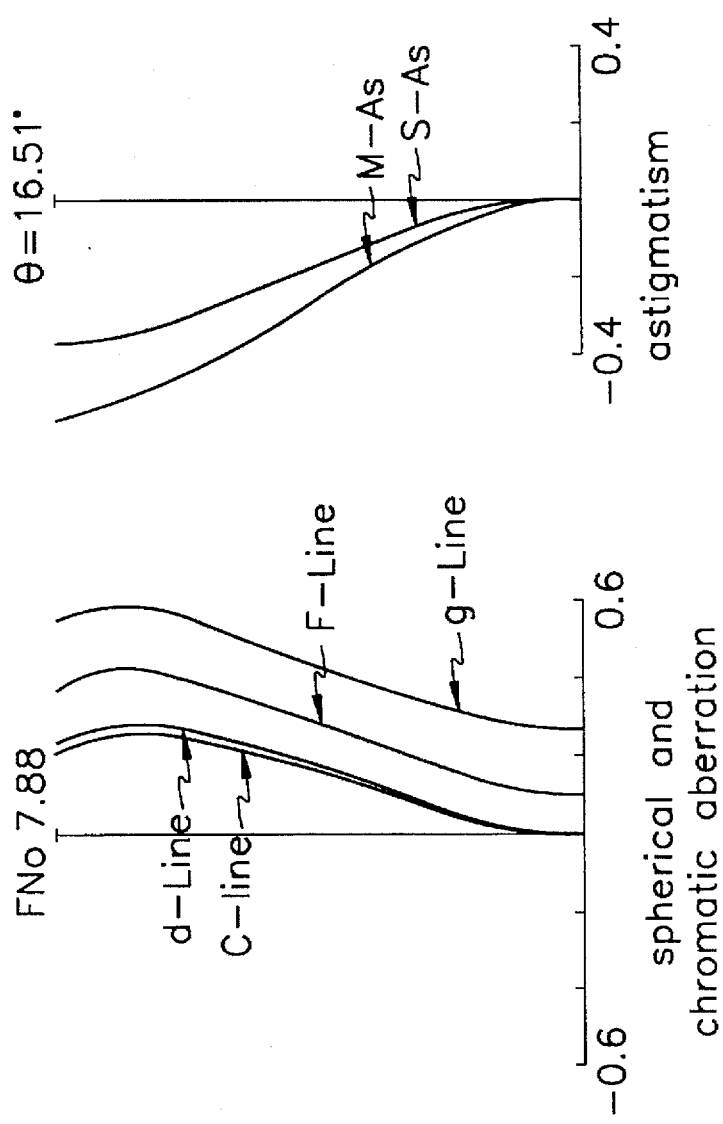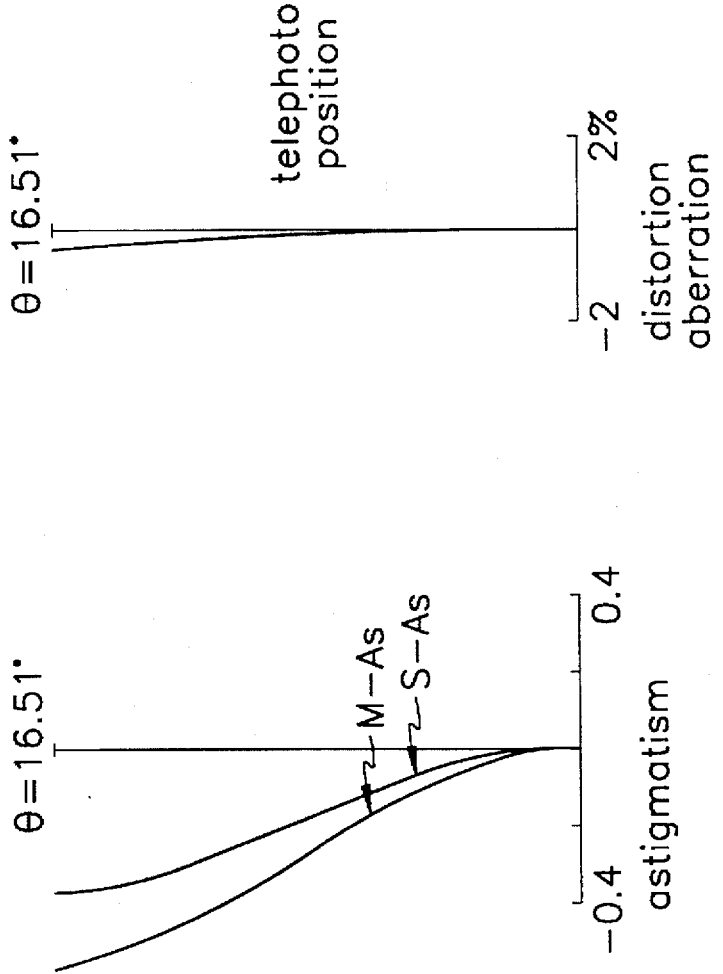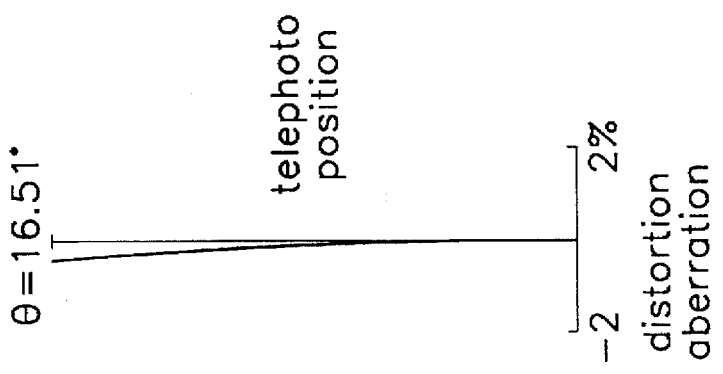

COMPACT ZOOM LENS SYSTEM

BACKGROUND OF THE INVENTION

A. Field of the Invention

The present invention relates to a compact zoom lens system. More particularly, the present invention relates to a compact zoom lens system that can obtain a wide view angle, a high zooming ratio and a low telephoto ratio.

B. Description of the Prior Art

Recently, it has become increasingly popular to use a zoom lens system as a picture-taking lens in a leaf shutter-type camera. In addition to aspherical lenses, research and development of zoom lens systems has sharply increased due to the desire to make cameras smaller in size and lighter in weight.

Conventional compact zoom lens systems are disclosed in Japanese Patent Laid-open Nos. 92-93810, 94-34884, and 94-14678. A problem with the conventional zoom lens systems which have two groups of lenses is that they generally suffer from a low zooming ratio of around 1.6. When these zoom lens systems are designed to have a zooming ratio higher than two, however, it becomes difficult to correct for aberrations at a wide angle position and the light incident to the lens system will have to be limited at a telephoto position. An additional problem with the conventional zoom lens system is that since the size of a picture screen is fixed over the range of a wide view angle of greater than 62 degrees, the focal length is relatively shortened. Finally, there exists the problem that the wide view angle with a telephoto ratio lower than one, results in poor aberration performance.

SUMMARY OF THE INVENTION

An important principle advantage of the present invention is the provision of an arrangement which substantially obviates one or more of the limitations and disadvantages of the described prior art arrangements. In particular, the present invention is directed to a compact zoom lens system that has a large wide view angle, a high zooming ratio, and a low telephoto ratio.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a compact zoom lens system including a first lens group which has an overall positive refractive power and a second lens group which has an overall negative refractive power. The first lens group further includes a first lens unit which is a meniscus lens that is convex toward an object, and which has a positive refractive power with respect to the object. Also included in the first lens group is a second lens unit which has a negative refractive power with respect to the object. Further, the first lens group includes a third lens unit which is a biconvex lens having a positive refractive power with respect to the object, and which is fixed to the second lens unit. Finally, the first lens unit includes a fourth lens unit which is a biconvex lens having a positive refractive power with respect to the object.

The second lens group includes a fifth lens unit which is meniscus lens that is convex toward an image side, and which has a positive refractive power with respect to the object. Also included is a sixth lens unit that is convex toward the image side. Finally, the second lens group includes a seventh lens unit which is a meniscus lens that is convex toward the image side, and which has a negative refractive power with respect to the object.

According to the invention, the magnification of the system can be varied by varying a distance between the first lens group and the second lens group. Also in accordance with the invention, the following conditions are satisfied:

$$0.59 < f_I/f_w < 0.67,$$

$$0.17 < D_s/f_w < 0.22,$$

$$-0.63 < f_{II}/f_w < -0.55,$$

where:

$f_I$ represents the focal length of the first lens group;

$f_{II}$ represents the focal length of the second lens group;

$D_s$ represents a distance the first lens group is shifted from a wide angle position to the telephoto position during zooming; and $f_w$ represents the focal length of the system at the wide angle position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIGS. 3A to 3C show the aberration curves of a compact zoom lens system at the wide angle position according to a first embodiment of the present invention;

FIGS. 4A to 4C show the aberration curves of a compact zoom lens system at the telephoto position according to the first embodiment of the present invention;

FIGS. 7A to 7C show the aberration curves of a compact zoom lens system at the wide angle position according to the third embodiment of the present invention;

FIGS. 10A to 10C show the aberration curves of a compact zoom lens system at the telephoto position according to a fourth embodiment of the present invention;

FIGS. 11A to 11C show the aberration curves of a compact zoom lens system at the wide angle position according to a fifth embodiment of the present invention; and FIGS. 12A to 12C show the aberration curves of a compact zoom lens system at the telephoto position according to the fifth embodiment of the present invention.

DETAILED DESCRIPTION OF THE PREFERRED EMBODIMENTS

Embodiments of the present invention will now be described with reference to the accompanying drawings.

Figure 1:
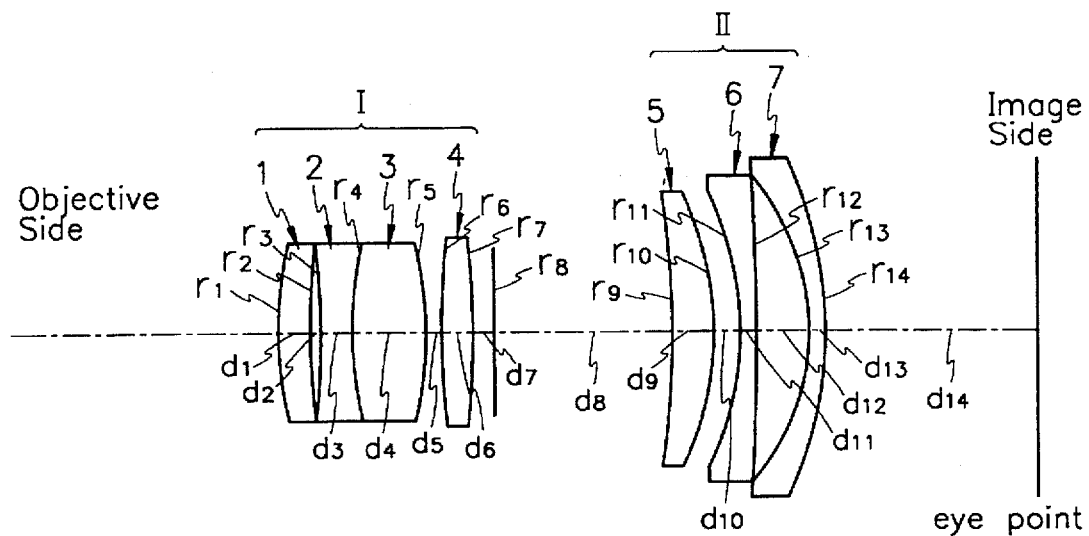
FIG. 1 is a sectional view illustrating a compact zoom lens system at a wide angle position in accordance with an embodiment of the present invention.
Figure 2:
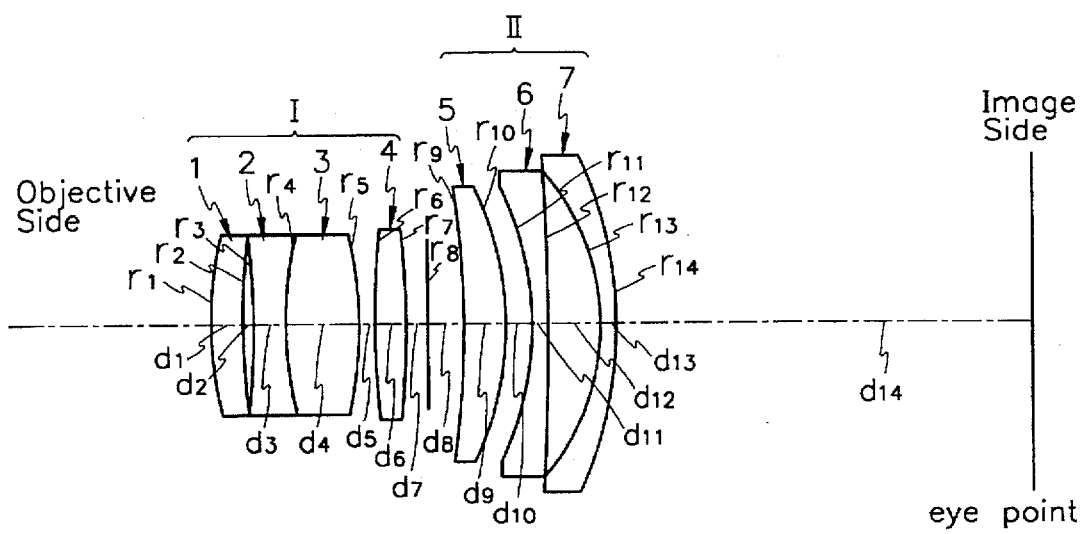
FIG. 2 is a sectional view illustrating a compact zoom lens system at a telephoto position in accordance with an embodiment of the present invention.
Figure 5A:
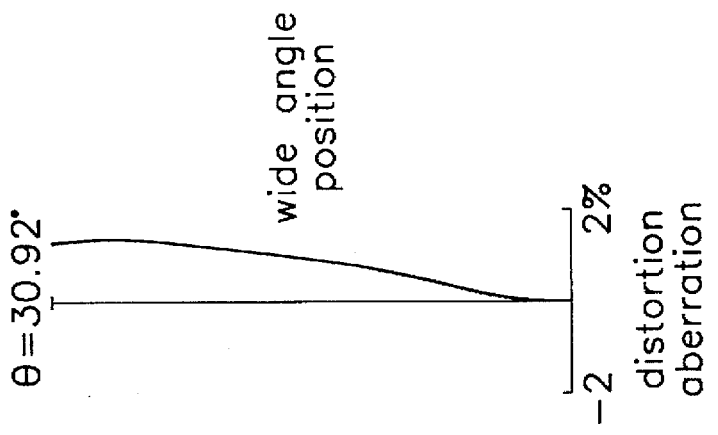
FIGS. 5A to 5C show the aberration curves of a compact zoom lens system at the wide angle position according to a second embodiment of the present invention.
Figure 5B:
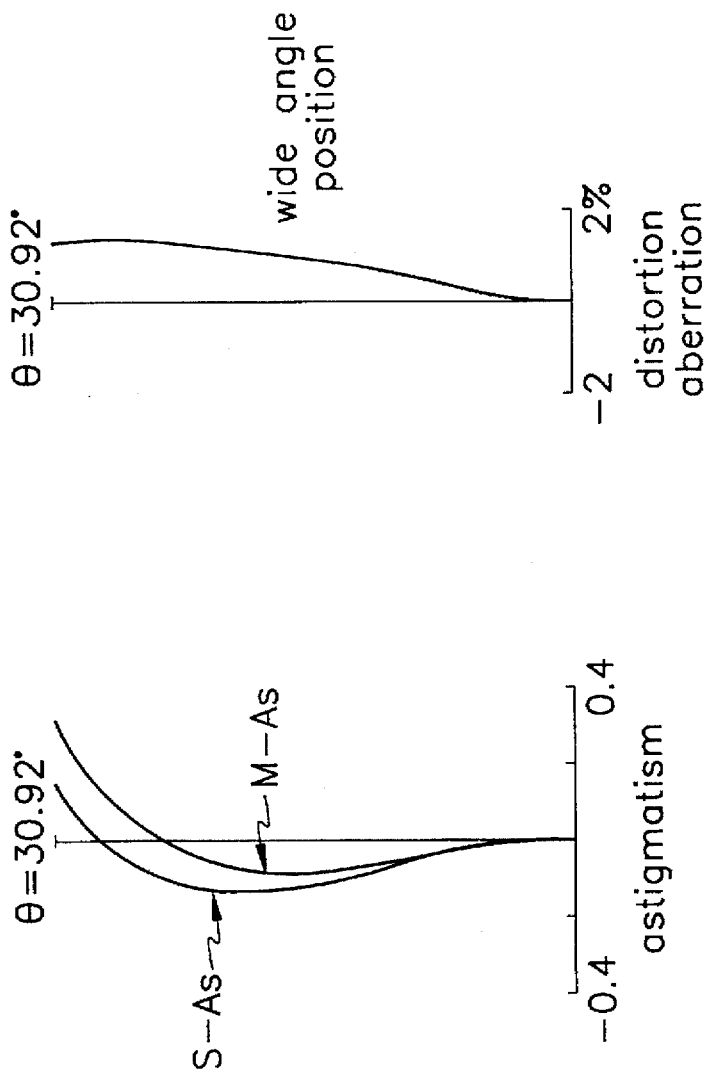
Figure 5C:
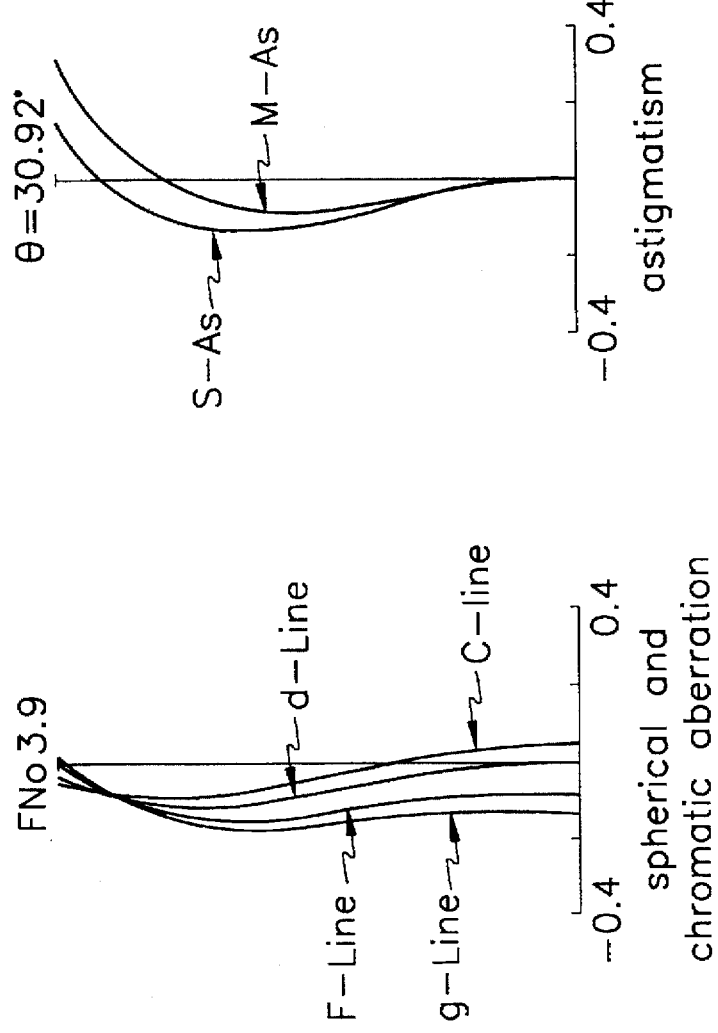
Figure 6C:
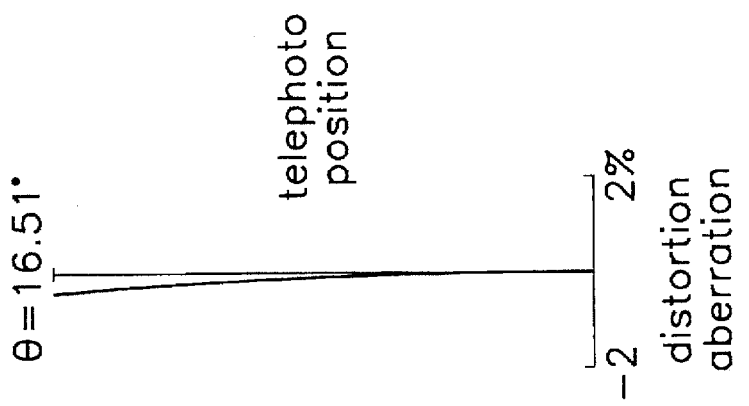
FIGS. 6A to 6C show the aberration curves of a compact zoom lens system at the telephoto position according to a second embodiment of the present invention.
Figure 6B:
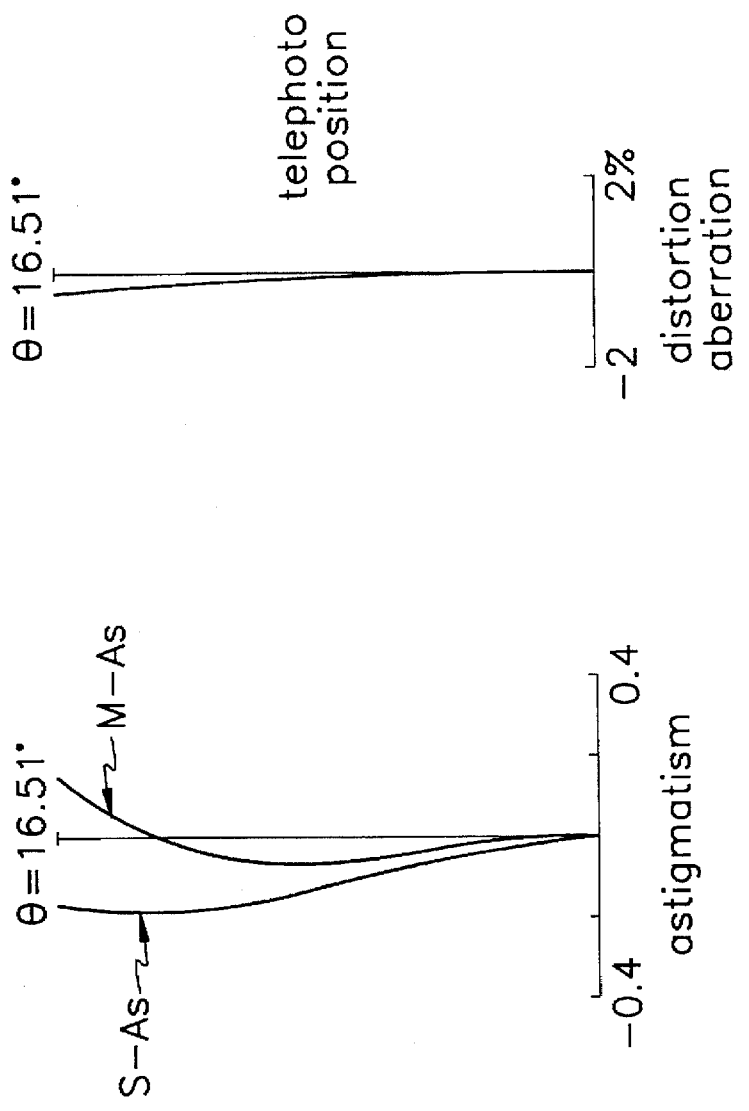
Figure 6A:
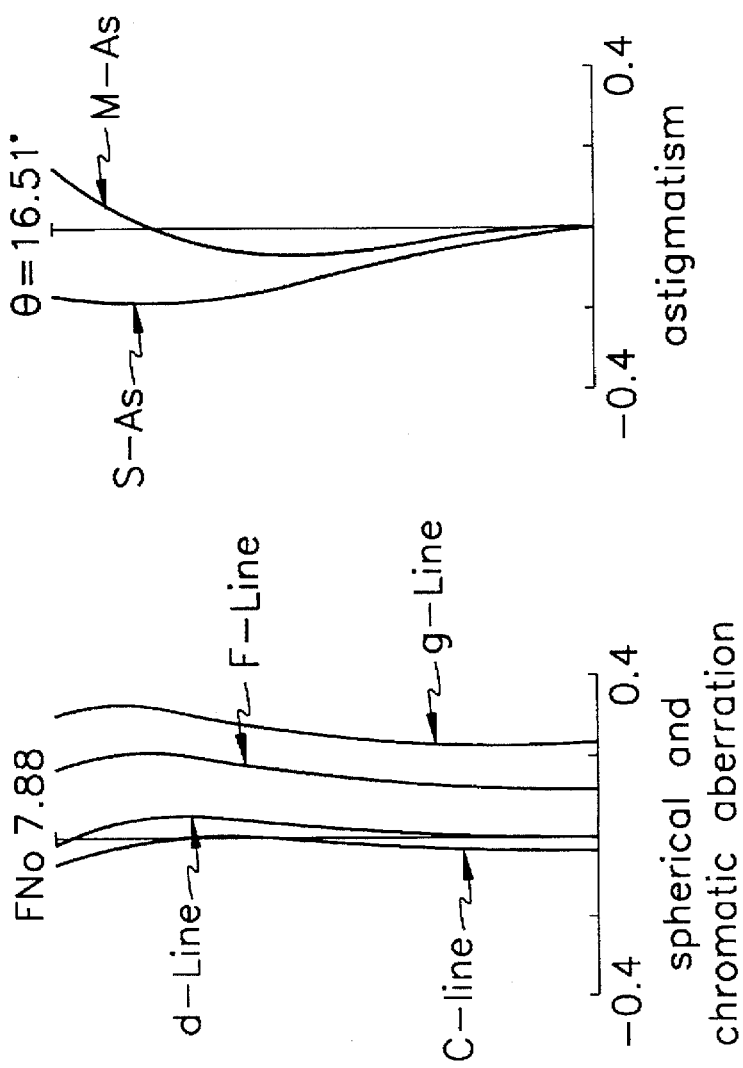
Figure 8C:
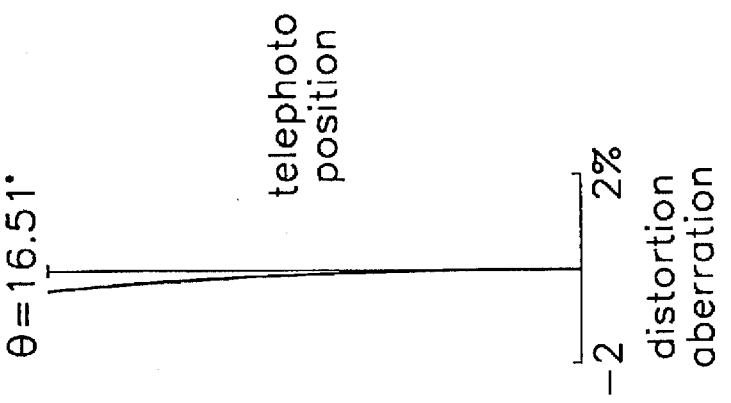
FIGS. 8A to 8C show the aberration curves of a compact zoom lens system at the telephoto position according to the third embodiment of the present invention.
Figure 8B:
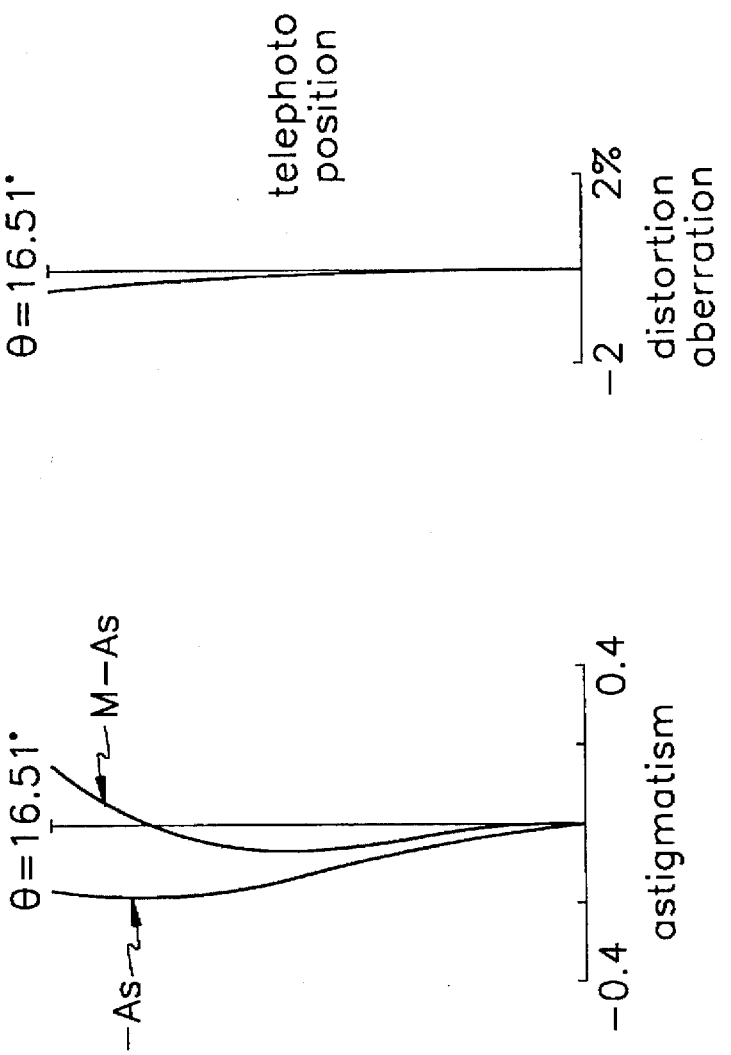
Figure 8A:
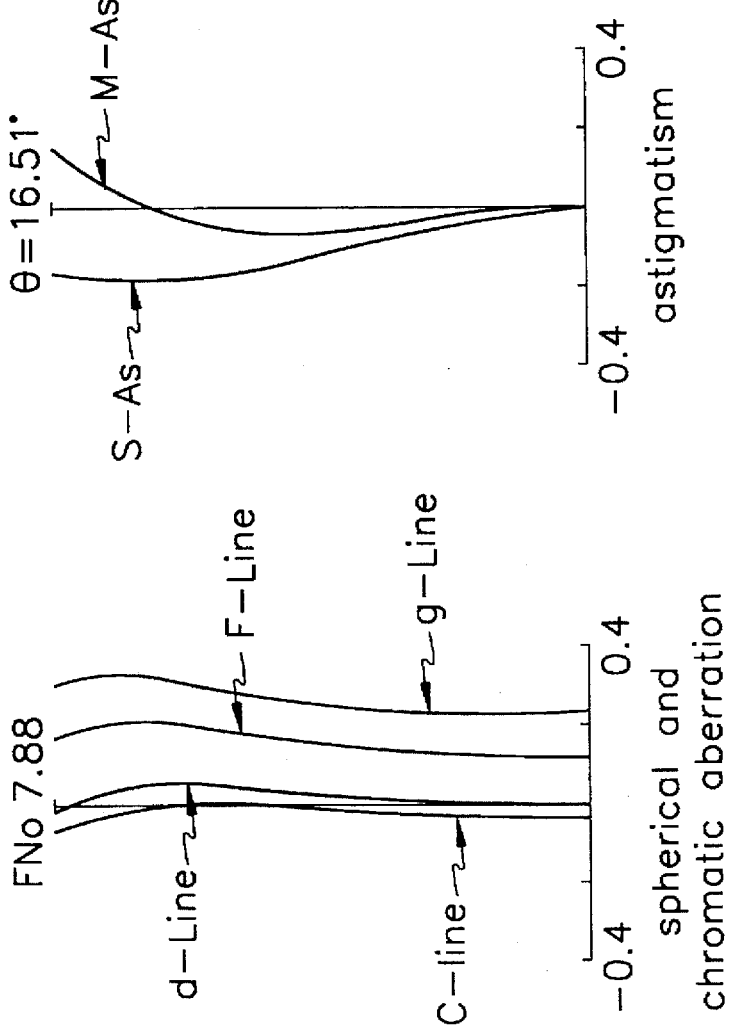
Figure 9C:
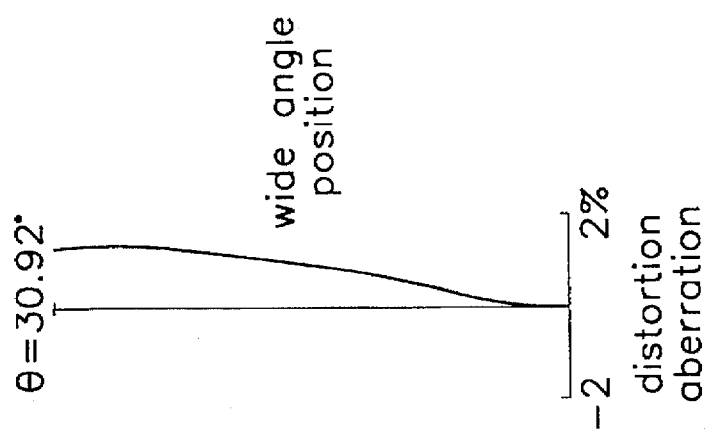
FIGS. 9A to 9C show the aberration curves of a compact zoom lens system at the wide angle position according to a fourth embodiment of the present invention.
Figure 9B:
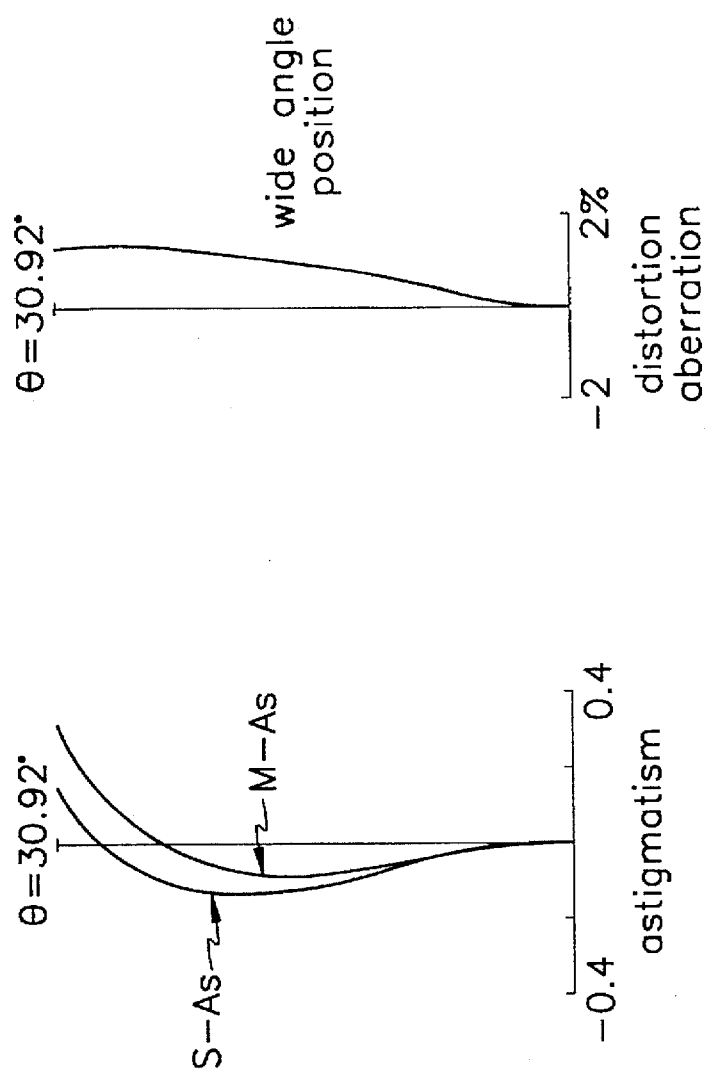
Figure 9A:
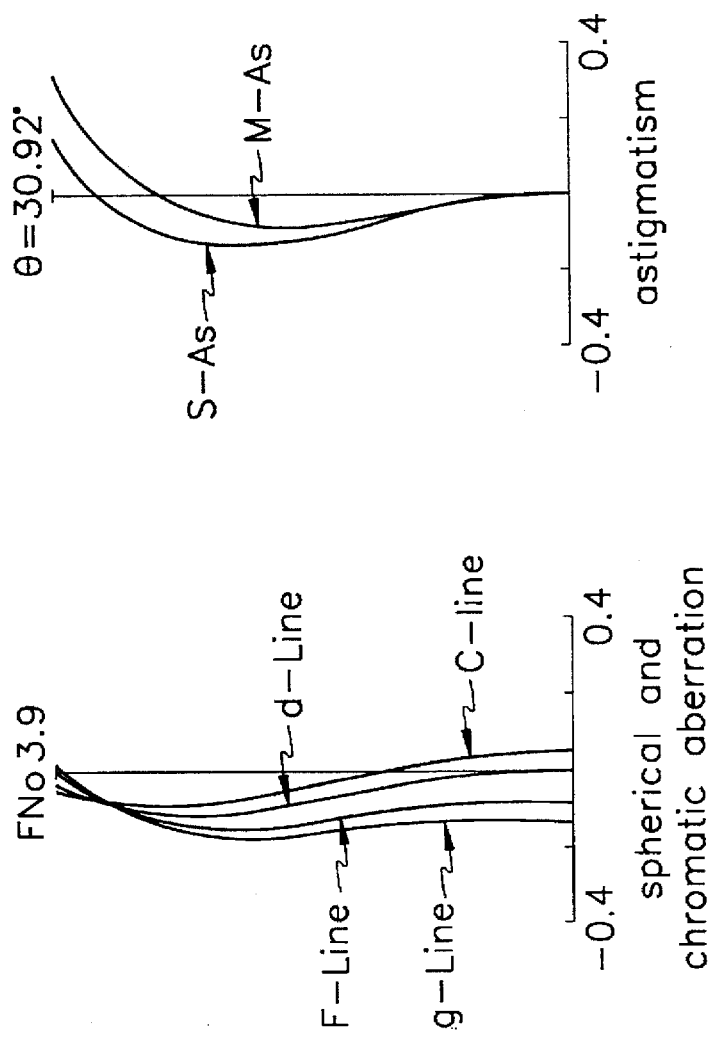

As illustrated in FIGS. 1 and 2, an embodiment according to the present invention provides a compact zoom lens system. Starting from the objective side of the zoom lens system (i.e., from the left side of the Figures), a first lens group I forms an image of an object and provides the image to a second lens group II.

The objective lens group I, which has an overall positive refractive power, includes four lenses. A first lens unit 1 is a meniscus lens, convex toward the objective side, and has a positive refractive power. A second lens unit 2, having a negative refractive power, is cemented to a third lens unit 3 which is a biconvex lens having a positive refractive power. A fourth lens unit 4 is also a biconvex lens and has a positive refractive power.

The second lens group II, which has an overall negative refractive power, includes three lenses. A fifth lens unit 5 is meniscus lens, convex towards the image side (the right side of the Figures), and has a positive refractive power. A sixth lens unit 6 is also convex towards the image side, but has a negative refractive power. A seventh lens unit 7 is a meniscus lens, convex towards the image side, and has a negative refractive power.

The magnification of the compact zoom lens system can be varied by varying the distance between the first lens group I and the second lens group II. In accordance with a preferred embodiment of the invention, the compact zoom lens system satisfies the following conditions:

$$0.59 < f_I/f_w < 0.67 \quad (1)$$

$$0.17 < D_s/f_w < 0.22 \quad (2)$$

$$-0.63 < f_{II}/f_w < -0.55 \quad (3)$$

$$0.90 < f_1/f_w < 1.2 \quad (4)$$

$$0.26 < f_{bw}/f_w < 0.31, \quad (5)$$

where:

$f_I$ represents the focal length of the first lens group I;

$f_{II}$ represents the focal length of the second lens group II;

$D_s$ represents the distance the first lens group I is shifted from a wide angle position to the telephoto position during zooming;

$f_w$ represents the focal length of the entire lens system at the wide angle position;

$f_1$ represents the focal length of the first lens unit 1 in the first lens group I; and $f_{bw}$ represents the back focal length of the overall optical system at the wide angle position.

The operation of the compact zoom lens system, in accordance with the embodiments of the present invention, will now be described. The zoom lens system comprises two lens groups I and II. In relation to the object side, the first lens group I has a positive refractive power while the second lens group II has a negative refractive power. Because of this two lens group arrangement, positive distortion increases in obtaining a wide view angle of over 60 degrees.

Further, since the second lens group II in the present invention comprises two or three lenses, positive distortion in the second lens group II is more likely to occur than in the first lens group I. In order to compensate for this distortion, a negative distortion aberration must occur in the first lens group I. For this purpose, the negative distortion is effectively generated in the first lens group I by providing the second lens unit 2 with a negative refractive power and the third lens unit 3 with a positive refractive power.

To generate the negative refractive power in the second lens unit 2, a biconcave type lens may be used since this type of lens has a strong negative refractive power. This type of lens also allows for compensation to be made through the use of the lens' aspherical surface. Thus, when this type of lens is cemented to the third lens unit 3 as described above, the chromatic aberration on an optical axis and the spherical aberration can each be effectively compensated for in the system. Specifically, when zooming from a wide angle position to a telephoto position, the magnification's chromatic aberration is compensated for by making the second lens unit 2 concave toward the image side and the third lens unit 3 convex toward the object side. The aberrations can be compensated for since the first lens unit 1 is a meniscus lens having a relatively weak positive refractive power.

Condition (1) relates to the refractive power of the first lens group I. If the ratio $f_I/f_w$ does not exceed the upper limit of condition (1), then it will be easier to compensate for aberrations. However, the variation of the focal length of the overall system gets smaller in relation with the distance variation of the first lens group I and the second lens group II.

If the ratio $f_I/f_w$ falls below the lower limit of condition (1), then the refractive power will increase causing the variation in the spherical aberration and the coma to increase during the variation of the focal length (i.e., during zooming). However, the length of the optical system is shortened.

Condition (2) is directed to the refractive power and the overall length of the optical system. If the ratio $D_s/f_w$ does not exceed the upper limit of condition (2), then it will be easier to compensate for the aberrations. However, the variation of the focal length, in relation to the distance variation during zooming, decreases. In addition, the telephoto ratio is increased due to the increase in length of the overall optical system.

If the ratio $D_s/f_w$ falls below the lower limit of condition (2), then the decrease in the distance variation during zooming will make miniaturization easier. However, the refractive power of the second lens unit 2 will then be large, thus making the spherical aberration, coma, and distortion become large as well, and the manufacture of the lens becomes difficult.

Along with condition (1), condition (3) proportionately determines the focal length of the second lens group II in order to compact the zoom lens system. In order to shorten the overall length of the zoom lens at the wide angle position, the second lens group II must have a large magnification. Accordingly, condition (3) determines the condition for obtaining the desired Petzval sum, the compensating astigmatism and the field curvature.

If the ratio $f_{II}/f_w$ exceeds the upper limit of condition (3), then the refractive power of the second lens group II decreases and the Petzval sum is increased in positive value.

In this case, it will be difficult to compensate for the astigmatism and field curvature.

If the ratio $f_{II}/f_w$ falls below the lower limit of condition (3), then the refractive power of the second lens group II increases and the Petzval sum is increased in negative value. In this case, it will be difficult to compensate for the astigmatism and field curvature with large spherical aberration and distortion.

Condition (4) determines the focal length of the first lens unit 1 of the first lens group I at the wide angle position in order to compensate for aberrations. If the ratio $f_1/f_w$ exceeds the upper limit of condition (4), then the increase in the positive refractive power in the first lens group I will cause an increase in coma and astigmatism.

If the ratio $f_1/f_w$ falls below the lower limit of condition (4), then an increase in astigmatism will make it difficult to gain a desired image performance.

Condition (5) determines the back focal length required for the compactness of the lens system. If the ratio $f_{bw}/f_w$ exceeds the upper limit of condition (5), then the lens's overall length will increase. This makes it difficult to compact the zoom lens system.

If the ratio $f_{bw}/f_w$ falls below the lower limit of condition (5), then the meniscus lenses of the second lens group II, which have a negative refractive powers at the wide angle position, come close to the film surface. This causes the effective pupil size to be enlarged, and leads to an increase in the size of the entire lens barrel.

According to the present invention, the first lens group I and the second lens group II include respective cemented lenses which have surfaces with the same radii of curvature in absolute value. Therefore, since the surfaces have the same radii of curvature in absolute value, manufacturing costs are lowered, resulting in a low-priced, high-quality optical system. In particular, the same radii of curvature for the fifth surface $r_4$ and the sixth surface $r_5$ makes the lens production more efficient and cuts down on production cost.

Values which satisfy the above-mentioned conditions are described in the Tables below in which all units of length are denominated in millimeters. In these Tables, the following variables are used:

$r_i$ (i=1 to 14) represents a radius of curvature of the refracting surface;

$d_i$ (i=1 to 14) represents a lens's thickness or the distance from lens to lens;

nd represents a refractive index of each lens for sodium d-line;

v represents a Abbe number of each lens;

m represents a magnification of the whole lens system; and w represents a half view angle.

In addition, in each of the embodiments described in the following Tables, the focal length f of the compact zoom lens system ranges from 28.8 mm to 58.206 mm and the half view angle ranges from 16.5 to 30.9 degrees.

Values for a first preferred embodiment of the present invention are shown in Table 1, where a back focal length $f_{bw}$ ranges from 8.1266 mm to 35.7398 mm.

TABLE 1

| Surface number | Radius of curvature ($r_i$) | Thickness ($d_i$) | Refractive index (nd) | Abbe number(v) |
|---|---|---|---|---|
| 1 | 12.21783 | 1.6000 | 1.60362 | 38.01 |
| 2 | 36.05031 | 0.6728 | | |
| 3 | −12.88986 | 1.6631 | 1.80610 | 40.73 |
| 4 | 11.81147 | 3.8063 | 1.48749 | 70.44 |
| 5 | −11.81147 | 0.8578 | | |
| 6 | 29.47880 | 1.8500 | 1.60311 | 60.69 |
| 7 | −17.25729 | 1.2000 | | |
| 8 | aperture | 7.8053 to 2.1000 | | |
| 9 | −31.18947 | 2.1000 | 1.80610 | 33.27 |
| 10 | −12.68006 | 1.2808 | | |
| 11 | −12.68006 | 0.8400 | 1.78590 | 43.93 |
| 12 | −146.78099 | 2.6603 | | |
| 13 | −9.60336 | 0.9303 | 1.75700 | 47.71 |
| 14 | −20.57875 | | | |

FIGS. 3A to 3C and FIGS. 4A to 4C illustrate the superior aberration characteristics of the first preferred embodiment, at a wide angle and telephoto position, respectively.

Values for a second preferred embodiment of the present invention are shown in Table 2, where the back focal length $f_{bw}$ ranges from 8.355 mm to 35.9538 mm.

TABLE 2

| Surface number | Radius of curvature ($r_i$) | Thickness ($d_i$) | Refractive index (nd) | Abbe number(v) |
|---|---|---|---|---|
| 1 | 12.44271 | 1.6000 | 1.59551 | 39.22 |
| 2 | 39.37728 | 0.6728 | | |
| 3 | −12.55900 | 1.8349 | 1.79950 | 42.34 |
| 4 | 11.70069 | 4.0000 | 1.49700 | 81.61 |
| 5 | −11.70069 | 0.4923 | | |
| 6 | 26.76242 | 1.8500 | 1.56883 | 56.04 |
| 7 | −17.26274 | 1.2000 | | |
| 8 | aperture | 7.6687 to 2.1000 | | |
| 9 | −32.06340 | 2.1000 | 1.80610 | 33.27 |
| 10 | −12.55929 | 1.2210 | | |
| 11 | −12.55929 | 0.8400 | 1.79950 | 42.34 |
| 12 | −140.07187 | 2.6256 | | |
| 13 | −9.54305 | 0.9300 | 1.74330 | 49.22 |
| 14 | −21.09756 | | | |

FIGS. 5A to 5C and FIGS. 6A to 6C illustrate the superior aberration characteristics of the second preferred embodiment, at a wide angle and telephoto position, respectively.

Values for a third preferred embodiment of the present invention are shown in Table 3, where the back focal length $f_{bw}$ ranges from 8.2909 mm to 35.9094 mm.

TABLE 3

| Surface number | Radius of curvature ($r_i$) | Thickness ($d_i$) | Refractive index (nd) | Abbe number(v) |
|---|---|---|---|---|
| 1 | 12.50402 | 1.6000 | 1.59551 | 39.22 |
| 2 | 39.47031 | 0.6728 | | |
| 3 | −12.54398 | 1.8953 | 1.79950 | 42.34 |
| 4 | 11.74414 | 4.0000 | 1.49700 | 81.61 |
| 5 | −11.74414 | 0.4319 | | |
| 6 | 26.35391 | 1.8500 | 1.56883 | 56.04 |
| 7 | −17.31383 | 1.2000 | | |
| 8 | aperture | 7.6640 | | |

TABLE 3-continued

| Surface number | Radius of curvature ($r_i$) | Thickness ($d_i$) | Refractive index (nd) | Abbe number($\upsilon$) |
|---|---|---|---|---|
| | | to 2.1000 | | |
| 9 | −30.14944 | 2.1000 | 1.80610 | 33.27 |
| 10 | −12.55929 | 1.2939 | | |
| 11 | −12.55929 | 0.8400 | 1.79950 | 42.34 |
| 12 | −127.16002 | 2.6640 | | |
| 13 | −9.48691 | 0.9300 | 1.72000 | 50.34 |
| 14 | −20.94965 | | | |

FIGS. 7A to 7C and FIGS. 8A to 8C illustrate the superior aberration characteristics of the third preferred embodiment, at a wide angle and telephoto position, respectively.

Values for a fourth preferred embodiment of the present invention are shown in Table 4, where the back focal length $f_{bw}$ ranges from 8.0293 mm to 35.6636 mm.

TABLE 4

| Surface number | Radius of curvature ($r_i$) | Thickness ($d_i$) | Refractive index (nd) | Abbe number($\upsilon$) |
|---|---|---|---|---|
| 1 | 12.15860 | 1.6000 | 1.60342 | 38.01 |
| 2 | 35.79931 | 0.6728 | | |
| 3 | −12.92341 | 1.4922 | 1.80610 | 40.73 |
| 4 | 11.72785 | 4.0000 | 1.48749 | 70.44 |
| 5 | −11.72785 | 0.8350 | | |
| 6 | 28.84426 | 1.8500 | 1.60311 | 60.69 |
| 7 | −17.65413 | 1.2000 | | |
| 8 | aperture | 7.7288 | | |
| | | to 2.1000 | | |
| 9 | −28.68800 | 2.1000 | 1.80610 | 33.27 |
| 10 | −12.52768 | 1.4139 | | |
| 11 | −12.15864 | 0.8400 | 1.78590 | 43.93 |
| 12 | −138.21939 | 2.6899 | | |
| 13 | −9.66387 | 0.9300 | 1.78800 | 47.49 |
| 14 | −18.51970 | | | |

FIGS. 9A to 9C and FIGS. 10A to 10C illustrate the superior aberration characteristics of the fourth preferred embodiment, at a wide angle and telephoto position, respectively.

Values for a fifth preferred embodiment of the present invention are shown in Table 5, where the back focal length $f_{bw}$ ranges from 7.9909 mm to 35.522 mm.

TABLE 5

| Surface number | Radius of curvature ($r_i$) | Thickness ($d_i$) | Refractive index (nd) | Abbe number($\upsilon$) |
|---|---|---|---|---|
| 1 | 12.24585 | 1.6000 | 1.61293 | 36.96 |
| 2 | 35.22768 | 0.6728 | | |
| 3 | −13.00177 | 1.4684 | 1.80610 | 40.73 |
| 4 | 11.32046 | 4.0000 | 1.48749 | 70.44 |
| 5 | −11.86918 | 0.8588 | | |
| 6 | 26.95237 | 1.8500 | 1.58913 | 61.25 |
| 7 | −16.97195 | 1.2000 | | |
| 8 | aperture | 7.5849 | | |
| | | to 2.1000 | | |
| 9 | −25.12827 | 2.1000 | 1.80610 | 33.27 |
| 10 | −12.19576 | 1.4708 | | |
| 11 | −11.97528 | 0.8800 | 1.78590 | 43.93 |
| 12 | −106.94220 | 2.8122 | | |
| 13 | −9.29281 | 0.8800 | 1.74330 | 49.22 |
| 14 | −17.63340 | | | |

FIGS. 11A to 11C and FIGS. 12A to 12C illustrate the superior aberration characteristics of the fifth preferred embodiment, at a wide angle and telephoto position, respectively.

Values of the ratios for each of the conditions (1) through (5), according to the first through fifth embodiments, are shown in Table 6.

TABLE 6

| Conditional Expression | Emb. 1 | Emb. 2 | Emb. 3 | Emb. 4 | Emb. 5 |
|---|---|---|---|---|---|
| $f_1/f_w$ | 0.646 | 0.639 | 0.638 | 0.642 | 0.635 |
| $D_a/f_w$ | 0.198 | 0.193 | 0.193 | 0.195 | 0.190 |
| $f_{II}/f_w$ | −0.607 | −0.599 | −0.599 | −0.603 | −0.594 |
| $f_I/f_w$ | 1.037 | 1.038 | 1.044 | 1.033 | 1.036 |
| $f_{bw}/f_w$ | 0.282 | 0.290 | 0.288 | 0.279 | 0.277 |
| Radius Curvature of 1st lens gr. | r4 = 11.811<br>r5 = −11.811 | r4 = 11.701<br>r5 = −11.701<br>r3 = −12.559 | r4 = 11.744<br>r5 = −11.744 | r4 = 11.728<br>r5 = −11.728<br>r1 = 12.159 | |
| 1st lens gr.<br>2nd lens gr. | | r10 = −12.559 | | r11 = −12.159 | |
| Radius Curvature of 2nd lens gr. | r10 = −12.680<br>r11 = −12.680 | r10 = −12.559<br>r11 = −12.559 | r10 = −12.559<br>r11 = −12.559 | | |

In accordance with the embodiments of the present invention, the present invention can provide a compact zoom lens system used for a compact camera, with a wide view angle greater than 62 degrees, a zooming ratio higher than two, and a telephoto ratio lower than one.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A compact zoom lens system, from an object side to an image side, comprising:
    a first lens group which has an overall positive refractive power, the first lens group comprising:
        a first lens unit which is a meniscus lens that is convex toward an object, and which has a positive refractive power with respect to the object;
        a second lens unit which has a negative refractive power with respect to the object;
        a third lens unit which is a biconvex lens having a positive refractive power with respect to the object, and which is fixed to the second lens unit; and
        a fourth lens unit which is a biconvex lens having a positive refractive power with respect to the object;
    a second lens group which has an overall negative refractive power, the second lens group comprising:
        a fifth lens unit which is meniscus lens that is convex toward an image side, and which has a positive refractive power with respect to the object;
        a sixth lens unit that is convex toward the image side; and
        a seventh lens unit which is a meniscus lens that is convex toward the image side, and which has a negative refractive power with respect to the object; and wherein the magnification of the system can be varied by varying a distance between the first lens group and the second lens group, and wherein the following conditions are satisfied:

$$0.59 < f_I/f_w < 0.67,$$

$$0.17 < D_s/f_w < 0.22,$$

$$-0.63 < f_{II}/f_w < -0.55,$$

where:

$f_I$ represents the focal length of the first lens group;

$f_{II}$ represents the focal length of the second lens group;

$D_s$ represents a distance the first lens group is shifted from a wide angle position to the telephoto position during zooming; and $f_w$ represents the focal length of the system at the wide angle position.

2. The system of claim 1, wherein the following condition is satisfied:

$$0.90 < f_1/f_w < 1.2,$$

where $f_1$ represents the focal length of the first lens unit in the first lens group.

3. The compact zoom lens system of claim 1, wherein the following condition is satisfied:

$$0.26 < f_{bw}/f_w < 0.31,$$

where $f_{bw}$ represents the back focal length of the system at the wide angle position.

* * * * *